United States Patent
Mahloo et al.

(10) Patent No.: US 11,487,568 B2
(45) Date of Patent: Nov. 1, 2022

(54) DATA MIGRATION BASED ON PERFORMANCE CHARACTERISTICS OF MEMORY BLOCKS

(71) Applicant: Telefonaktiebolaget LM Ericsson (publ), Stockholm (SE)

(72) Inventors: Mozhgan Mahloo, Solna (SE); Amir Roozbeh, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 203 days.

(21) Appl. No.: 16/490,621

(22) PCT Filed: Mar. 31, 2017

(86) PCT No.: PCT/SE2017/050322
§ 371 (c)(1),
(2) Date: Sep. 3, 2019

(87) PCT Pub. No.: WO2018/182473
PCT Pub. Date: Oct. 4, 2018

(65) Prior Publication Data
US 2020/0012508 A1 Jan. 9, 2020

(51) Int. Cl.
*G06F 9/455* (2018.01)
*G06F 9/50* (2006.01)
(Continued)

(52) U.S. Cl.
CPC ........ *G06F 9/45558* (2013.01); *G06F 9/5077* (2013.01); *G06F 11/301* (2013.01);
(Continued)

(58) Field of Classification Search
CPC .............. G06F 9/45558; G06F 9/5077; G06F 11/3048; G06F 11/3051; G06F 11/3096;
(Continued)

(56) References Cited

U.S. PATENT DOCUMENTS 6,473,842 B1  10/2002  Tsutsumi
8,788,739 B2   7/2014  Chang et al.
(Continued)

FOREIGN PATENT DOCUMENTS

EP   1158395 A2   11/2001
EP   2784683 A1   10/2014

*Primary Examiner* — Benjamin C Wu
(74) *Attorney, Agent, or Firm* — Coats + Bennett, PLLC

(57) ABSTRACT

A performance manager (400, 500) and a method (200) performed thereby are provided, for managing the performance of a logical server of a data center. The data center comprises at least one memory pool in which a memory block has been allocated to the logical server. The method (200) comprises determining (230) performance characteristics associated with a first portion of the memory block, comprised in a first memory unit of the at least one memory pool; and identifying (240) a second portion of the memory block, comprised in a second memory unit of the at least one memory pool, to which data of the first portion of the memory block may be migrated to apply performance characteristics associated with the second portion. The method (200) further comprises initiating migration (250) of the data to the second portion of the memory block.

9 Claims, 8 Drawing Sheets

(51) Int. Cl.
*G06F 11/30* (2006.01)
*G06F 11/34* (2006.01)

(52) U.S. Cl.
CPC ...... *G06F 11/3006* (2013.01); *G06F 11/3048* (2013.01); *G06F 11/3051* (2013.01); *G06F 11/3055* (2013.01); *G06F 11/3096* (2013.01); *G06F 11/3423* (2013.01); *G06F 11/3428* (2013.01); *G06F 11/3433* (2013.01); *G06F 11/3442* (2013.01); *G06F 11/3495* (2013.01); *G06F 2009/45583* (2013.01); *G06F 2201/815* (2013.01); *G06F 2201/86* (2013.01); *G06F 2201/88* (2013.01); *G06F 2201/885* (2013.01); *G06F 2209/501* (2013.01); *G06F 2209/5011* (2013.01)

(58) Field of Classification Search
CPC ............. G06F 11/3428; G06F 11/3433; G06F 2009/45583; G06F 2209/501; G06F 3/0685
See application file for complete search history.

(56) References Cited

U.S. PATENT DOCUMENTS

| | | | |
|---|---|---|---|
| 8,838,931 B1* | 9/2014 | Marshak | G06F 3/0605 |
| | | | 711/170 |
| 8,868,797 B1* | 10/2014 | Kirac | G06F 3/061 |
| | | | 710/15 |
| 9,081,702 B2 | 7/2015 | Iyigun et al. | |
| 9,507,887 B1* | 11/2016 | Wang | G06F 3/0647 |
| 9,524,248 B2* | 12/2016 | Klein | G06F 12/123 |
| 10,001,927 B1* | 6/2018 | Trachtman | G06F 3/0688 |
| 10,042,578 B2* | 8/2018 | Karve | G06F 3/0685 |
| 2005/0041453 A1* | 2/2005 | Brazis | G11C 7/1006 |
| | | | 365/63 |
| 2009/0235269 A1 | 9/2009 | Nakajima et al. | |
| 2013/0036266 A1 | 2/2013 | Naganuma et al. | |
| 2013/0325823 A1* | 12/2013 | Resch | H04L 63/0823 |
| | | | 707/695 |
| 2013/0326109 A1 | 12/2013 | Kivity | |
| 2014/0025923 A1* | 1/2014 | Klein | G06F 12/1009 |
| | | | 711/206 |
| 2015/0088462 A1* | 3/2015 | Wang | G06F 11/3428 |
| | | | 702/186 |
| 2015/0286413 A1* | 10/2015 | Olson | G06F 16/119 |
| | | | 711/112 |
| 2015/0381426 A1 | 12/2015 | Roese et al. | |
| 2016/0085481 A1* | 3/2016 | Antony | G06F 3/0647 |
| | | | 718/1 |
| 2016/0283394 A1* | 9/2016 | Chahal | G06F 3/0631 |
| 2016/0306554 A1* | 10/2016 | Li | G06F 3/0649 |
| 2017/0060980 A1* | 3/2017 | Harris, Jr. | G06F 16/122 |
| 2018/0046383 A1* | 2/2018 | Gates | G06F 3/0644 |
| 2018/0129443 A1* | 5/2018 | Karve | G06F 3/0653 |
| 2020/0025629 A1* | 1/2020 | Zinger | G06F 16/9535 |
| 2020/0174926 A1* | 6/2020 | Roozbeh | G06F 11/3034 |
| 2021/0034271 A1* | 2/2021 | Xie | G06F 3/0647 |

* cited by examiner

| | CPU pool 1 | CPU pool 2 | .... | CPU pool x |
|---|---|---|---|---|
| Memory unit 1.1 | 1 | 1.8 | ... | 2.5 |
| Memory unit 1.2 | 1 | 1.8 | ... | 2.5 |
| ... | ... | ... | ... | ... |
| Memory unit n.m | 2 | 1 | ... | 0.5 |

Table 1: example of memory unit grading of system

US 11,487,568 B2

DATA MIGRATION BASED ON PERFORMANCE CHARACTERISTICS OF MEMORY BLOCKS

TECHNICAL FIELD

The present disclosure relates to data centers and in particular to data centers having a disaggregated hardware architecture.

BACKGROUND

In conventional server models, applications use data which is swapped between the primary and secondary memory of the system. The goal of the virtual memory techniques is to make an application think that it has more memory than actually exists. These techniques include implementing a Virtual Memory Manager, VMM, that, among other tasks, creates a file called a swap file in the secondary memory, such as a hard disk. Basically, the swap file (also known as a paging file) allows the application to store any extra data that can't be stored in the primary memory, i.e., the actual Random Access Memory, RAM, —because the RAM has limited storage capacity. Keep in mind that an application program may only use the data when it's actually in the RAM. So, the way virtual memory works is that whenever a piece of data needed by an application program cannot be found in the RAM, the program knows that the data must be in the paging file on the hard disk.

With the introduction of new architecture design within the data centers namely "disaggregated hardware architecture", the way current applications are working might change drastically, and they may achieve much better performance with the same or even less amount of hardware. A disaggregated hardware architecture comprises several pools of hardware resources such as pools of CPUs, memories, storage nodes as well as Network Interface Cards, NICs, connecting through a very fast interconnect (see FIG. 1). This means that distinct and pre-configured servers, as are common today, may disappear or be less common in future data center architectures. Logical servers may be created dynamically and on-demand by combining resources from a subset of available pools of hardware in the data center, or even within several geographically distinct data centers.

The possibility to select resources from the pools in a disaggregated hardware architecture provides flexibility in the creation of logical servers. However, a logical server, and applications executing thereon, may over time degrade in performance due to, e.g., non-optimal storage of data in the distributed system.

SUMMARY

Having different memory pools, brings the possibility of having different memory types, with distinct characteristics and distances to/from the CPU(s) of the CPU pool(s), composing a logical server, impacting the performance of the server and applications running on top of such a system. So, how to select the best memory location for each application during runtime is an interesting challenge in disaggregated hardware architecture. It should be noted that the memory access time can impact the performance of the server to a high degree, due to the fact that, during memory access time, CPUs might be locked and CPU cycles are wasted.

The existing solutions allocate a block of memory to a logical server from one or more memory pools and the applications are given a part of that memory block. The memory block is in the distributed hardware often divided into a number of, usually different sized, portions which may be comprised in different physical memory units of the one or more memory pools, i.e., one portion may be located in a one memory unit, and another portion of the same memory block may be located in another memory unit. However, there is no mechanism to differentiate between different memory units, and hence between the different portions of the allocated memory block of a logical server, and/or to update the characteristics dynamically. This might lead to unsuitable usage of memory pools as well as performance degradation of some applications and logical servers running on top of disaggregated hardware architecture. Physical characteristics of different memory units, as well as their distances and connection conditions between related CPUs, may severely impact the efficiency of how the memory is utilized.

The object is to obviate at least some of the problems outlined above. In particular, it is an object to provide a performance manager and a method performed by a performance manager for managing the performance of a logical server of a data center. These objects and others may be obtained by providing a performance manager and a method performed by a performance manager according to the independent claims attached below.

According to an aspect, a method performed by a performance manager for managing the performance of a logical server of a data center is provided. The data center comprises at least one memory pool in which a memory block has been allocated to the logical server. The method comprises determining performance characteristics associated with a first portion of the memory block, comprised in a first memory unit of the at least one memory pool; and identifying a second portion of the memory block, comprised in a second memory unit of the at least one memory pool, to which data of the first portion of the memory block may be migrated, to apply performance characteristics associated with the second portion of the memory block to the data. The method further comprises initiating migration of the data to the second portion of the memory block.

According to an aspect, a performance manager for managing the performance of a logical server of a data center is provided. The data center comprises at least one memory pool in which a memory block has been allocated to the logical server. The performance manager is configured for determining performance characteristics associated with a first portion of the memory block, comprised in a first memory unit of the at least one memory pool; and identifying a second portion of the memory block, comprised in a second memory unit of the at least one memory pool, to which data of the first portion of the memory block may be migrated, to apply performance characteristics associated with the second portion of the memory block to the data. The performance manager is also configured for initiating migration of the data to the second portion of the memory block.

The performance manager and the method performed by the performance manager have several possible advantages. One possible advantage is that the usage of the memory pools and the memory allocated to logical servers may be improved or optimized. Another possible advantage is that the use of the memory blocks may be configured based on requirement(s) of application(s) running on logical servers. Still a further possible advantage is that the memory units comprising the portions of the memory blocks may be sorted and/or graded dynamically. Still further, logical server and application performance during runtime may be improved and the execution time may be speeded up meaning that more tasks may be executed with less amounts of resources and in shorter time.

BRIEF DESCRIPTION OF DRAWINGS

Embodiments will now be described in more detail in relation to the accompanying drawings, in which.

DETAILED DESCRIPTION

Briefly described, a performance manager and a method performed thereby are provided, for managing the performance of a logical server of a data center. The performance manager may monitor e.g. the performance with regard to one or more parameters of a memory pool of a data center as well as connections between memory pools and CPU pools. The memory pools comprise a plurality of memory units, and a memory unit may comprise at least a portion of one or more memory blocks. By a portion of a memory block is herein meant a memory space having a consecutive range of memory addresses in a physical memory unit. A memory block may, thus, be divided into portions, which portions may be located in one or more, physical, memory units in the memory pool(s). Two, or more, portions of the same memory block may be located in the same memory unit and be separated from each other, i.e. the address ranges of the two or more portions are discontinued. Two, or more, portions of the same memory block in a memory unit may additionally or alternatively be directly adjacent to each other, i.e. the two or more portion have address ranges that are consecutive in the memory unit. The performance manager may monitor the memory pool as a whole by e.g. monitoring memory units, memory blocks and/or portions of memory blocks. The performance manager may identify that a portion of a memory block is not performing satisfactorily or optimally. Either the portion of the memory block cannot keep up with requirements of e.g. an application being executed on a logical server associated with that portion of the memory block thereby causing too much delay, or that portion of the memory block is not effectively used to its potential (thus being under used) thereby wasting resources. The performance manager may then take appropriate actions in order to adapt the performance characteristics to the requirements of, e.g., the application associated with that portion of the memory block. In order to adapt the performance characteristics to the requirements, the performance manager may initiate migration of the data stored in the memory to a new location, to apply more suitable performance characteristics to the data. This means that the performance manager may move, or initiate the move of, the data stored in that first portion of the memory block from its current memory unit to a second portion of the memory block, which second portion is located in another memory unit and is more compliant with e.g. the requirements of e.g. the application being executed on the logical server associated with that first portion of the memory block.

Figure 2A:
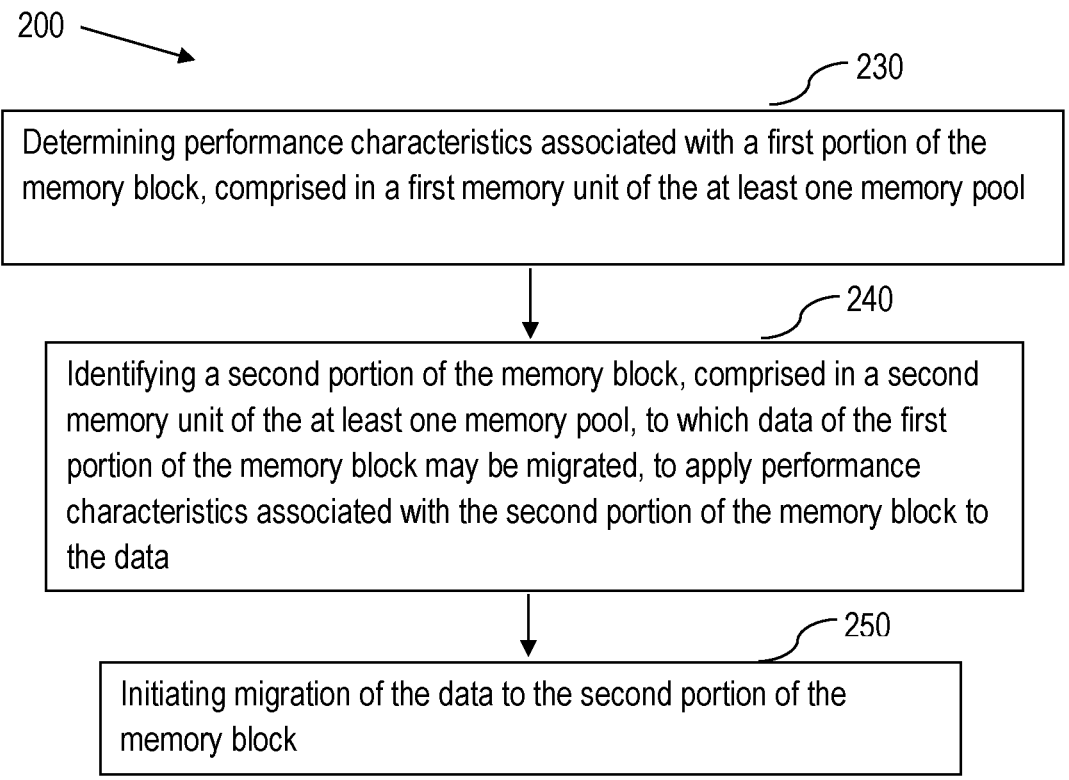
FIG. 2a is a flowchart of a method performed by a performance manager for managing the performance of a logical server of a data center, according to an exemplifying embodiment.

Embodiments herein relate to a method performed by a performance manager for managing the performance of a logical server of a data center. The data center comprises at least one memory pool in which a memory block has been allocated to the logical server. Embodiments of such a method will now be described with reference to FIGS. 2a-2c. FIG. 2a illustrates the method 200 comprising determining 230 performance characteristics associated with a first portion of a memory block, comprised in a first memory unit of the at least one memory pool; and identifying 240 a second portion of the memory block, comprised in a second memory unit of the at least one memory pool, to which data of the first portion of the memory block may be migrated, to apply performance characteristics associated with the second portion of the memory block to the data. The method 200 further comprises initiating migration 250 of the data to the second portion of the memory block.

Figure 1:
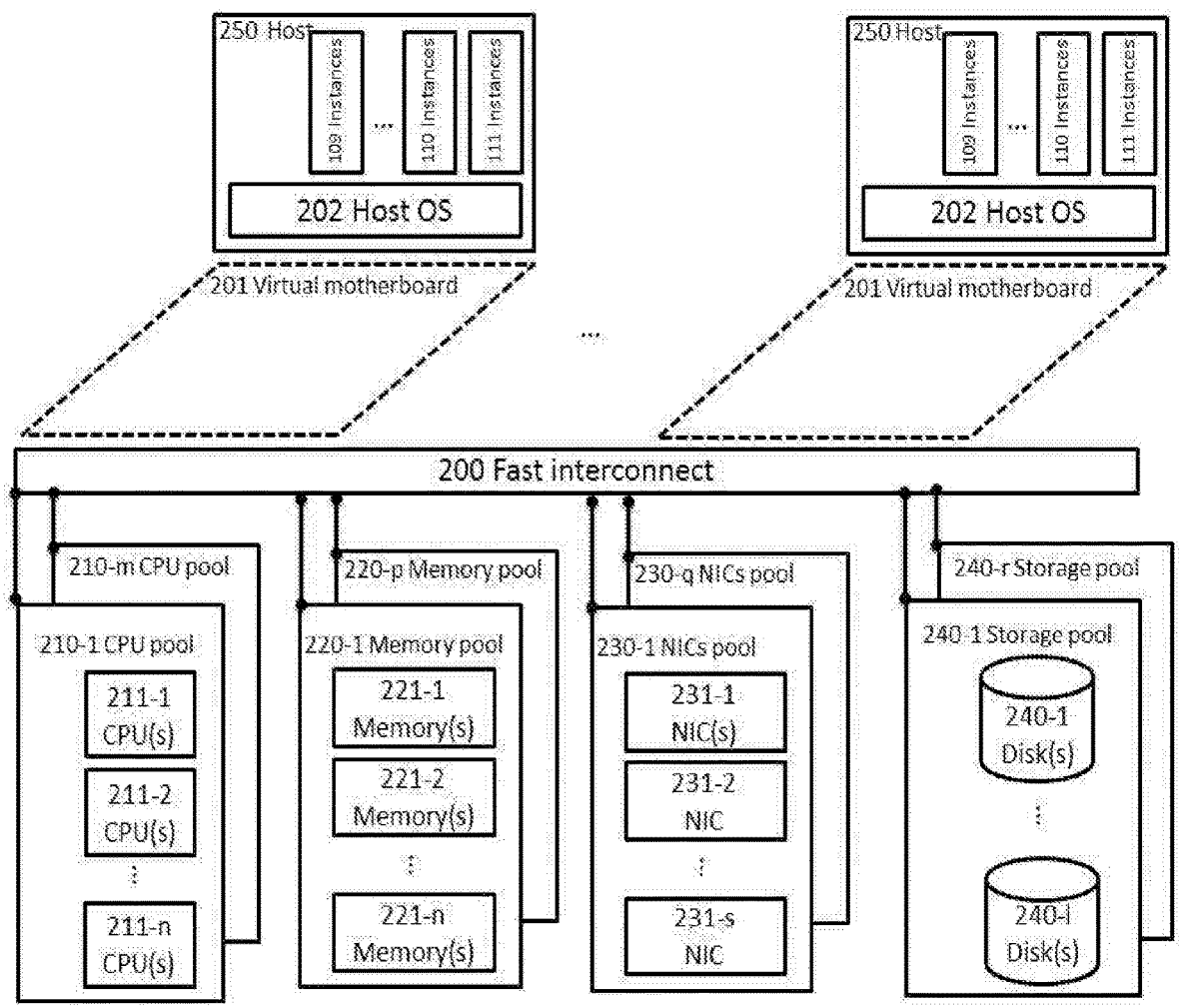
FIG. 1 is a schematic view of a disaggregated hardware architecture within a data center.

The data center may comprise a plurality of different pools as illustrated in FIG. 1. A host or logical server is assigned, or comprises, memory resources and CPU resources from respective one or more memory pools and one or more CPU pools. The amount of allocated resources, e.g. memory resources, may be dependent on the logical server and the applications requirements. In this disaggregated architecture, memory pools and resources within individual memory pools may have different distances to/from one or more CPU resources leading to different communication delays. Further, different types of memories with different access latencies such as Dynamic RAM, DRAM, Synchronous DRAM, SDRAM, etc. may be used in different memory pools.

The performance manager, at a point in time, determines performance characteristics associated with a first portion of a memory block, the first portion of the memory block being associated with, or comprised in, a first memory unit of one of the at least one memory pool. There are different types or examples of performance characteristics that may be determined by the performance manager as will be described in more detail below. The performance characteristics can be said to be a measure of how well the portion of the memory block is performing. Merely as an illustrative example, there may be one or more threshold values defined for different types of performance characteristics, wherein when a threshold value is met for a performance characteristic, the first portion of the memory block is performing satisfactorily and when the threshold value is not met, the first portion of the memory block is not performing satisfactorily. The definition of the threshold value defines what is satisfactorily, which may be a question for implementation. Merely as a non-limiting and illustrative example, the performance characteristic is delay, wherein when the threshold value is met, the delay is satisfactorily and when the threshold value is not met, the delay is too long, thus not satisfactorily. One possible reason for too long a delay may be that the first portion of the memory block is located relatively far from one or more CPU resources. In another non-limiting and illustrative example, the performance characteristics is how frequent the first the portion of the memory block is accessed. It may be that the memory is of a type that is adapted for frequent access or that the first portion of the memory block is located relatively close to one or more CPU resources, wherein if the first portion of the memory block is not accessed very frequently, then the first portion of the memory block is not optimally used. Further, the memory pool(s) may comprise different types of memory, e.g. Solid-State Drive, SSD, Non-Volatile RAM, NVRAM, SDRAM, and flash type of memory, which generally provide different access times so that data that is accessed frequently may be stored in a memory type having shorter access time such as a SDRAM and data that is accessed less frequently may be placed in a memory type having longer access type such as a NVRAM. The choice of memory may be dependent on various parameters in addition to access time, e.g. short time storage, long time storage, cost, writability etc.

The performance manager may identify 240 a second portion of the memory block, in a second memory unit comprised in the at least one memory pool, to which the data stored in the first portion of the memory block may be migrated, to apply performance characteristics associated with the second portion of the memory block to the data. Reverting to the two illustrative and non-limiting examples, (i) in order to reduce the delay, the content or data stored within the first portion of the memory block may be migrated to a another, second, portion of the memory block, comprised in a second memory unit comprised in the at least one memory pool which is physically located closer to one or more CPU resources; or (ii) in order to optimize the usage of the memory, the content or data stored within the first portion of the memory block in a first memory unit may be migrated to a second portion of the memory block in a second memory unit comprised in the at least one memory pool which is physically located further away from one or more CPU resources. The performance manager may identify 240 the second portion of the memory block, comprised in the second memory unit comprised in the at least one memory pool, to which the data stored in the first portion of the memory block may be migrated, to apply the performance characteristics of the second portion of the memory block depending on the type of adjustment or adaptation that is required.

Once the performance manager has identified the second portion of the memory block comprised in the second memory unit comprised in the at least one memory pool to which the data stored in the first portion of the memory block may be migrated, to apply the performance characteristics of the second portion of the memory block to the data, the performance manager may migrate, or initiate migration of, the data to the second portion of the memory block. In this manner, the performance manager may move data in portions of memory within the memory allocated to the logical server.

According to a simplified, illustrative and non-limiting example, assume that data portion A is physically located in a "good" part of the memory (portion of a memory block, a memory block or a memory unit) allocated to either the logical server or an application running on the logical server ("good" may mean e.g. relatively close to CPU). The data portion A used to be accessed very frequently but is now accessed rather unfrequently. On the another hand, a data portion B physically located in a part of the memory being physically farther away from the CPU than data portion A (which may be referred to as a "bad" part of the memory"), used to be accessed rather unfrequently but has now started to be accessed rather frequently. In order to increase the overall performance of the memory allocated to the logical server or the application running on the logical server, the performance manager may decide to move data portion B to a "good" part of memory, e.g. the part of the memory in which data portion A is located. But as the data portion A is located in that part, there is no space to move data portion B to. However, as data portion A is no longer being frequently accessed, the performance manager may first migrate data portion A to a part of the memory allocated to the logical server that is farther away from the CPU, e.g. to the "bad" part of the memory. In this manner, memory space is freed in the "good" part of the memory. The performance manager may then migrate the data portion B to the "good" part of the memory, thereby improving the usage of the memory, and also the performance of the application running on the logical server and the performance of the logical server.

The method performed by the performance manager has several advantages. One possible advantage is that the usage of the memory pools and the memory allocated to logical servers may be improved or optimized. Another possible advantage is that memory ranges may be selected based on requirement(s) of application(s) running on logical servers. Still a further possible advantage is that the memory units comprising the memory blocks, or portions thereof, may be sorted and/or graded dynamically. Still further, logical server and application performance during runtime may be improved and the execution time may be speeded up meaning that more tasks may be executed with less amounts of resources and in shorter time.

Figure 2B:
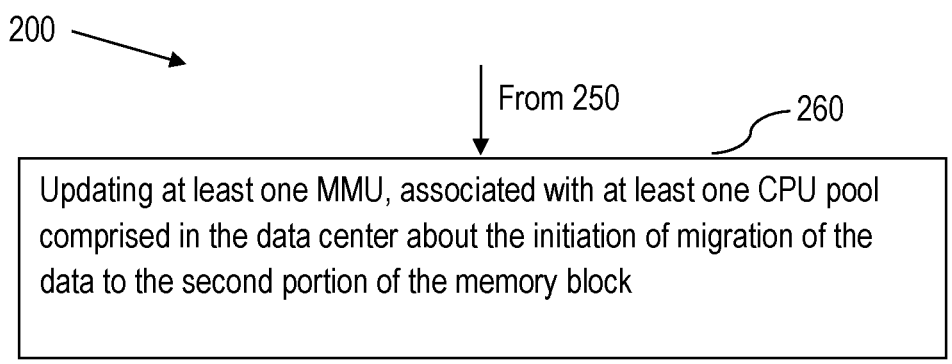
FIG. 2b is a flowchart of a method performed by a performance manager for managing the performance of a logical server of a data center, according to still an exemplifying embodiment.

The method may further comprise, as illustrated in FIG. 2b, updating 260 at least one Memory Management Unit, MMU, associated with at least one CPU pool comprised in the data center about the initiation of the migration of the data to the second portion of the memory block.

When the performance manager has performed the initiation of the migration of the data to the second portion of the memory block, comprised in the second memory unit, the performance manager may update at least one MMU associated with the at least one CPU pool about the migration. The MMU is associated with one or more CPUs or CPU pools, and the MMU may provide translations of a virtual memory address to a physical memory address, and the MMU is associated with the CPU (either by being implemented as part of the CPU, or as a separate circuit).

The CPU or CPUs allocated to the logical server need(s) to be able to access the migrated data, which due to the migration is located at a new physical address. For the CPU, as there may be a one to one mapping between the virtual memory address and physical addresses, after migration application virtual memory addresses should be updated and mapped to the correct virtual memory addresses which is updated by the MMU. In this manner, the CPU or CPUs may be oblivious of the migration and thus unaffected.

The initiating of the migration 250 of the data to the second portion of the memory block may comprise instructing at least one Memory Management Controller, MMC, to execute the migration.

In order for the migration to take place, the performance manager may instruct the MMC to execute the migration. The memory pool(s) may have one or more MMCs which are responsible for handling performance of the memory pools. The MMCs may then move the content or data from the first portion of the memory block to the identified second portion of the memory block in the second memory unit. The identified second portion of the memory block has a size at least corresponding to the first portion of the memory block so that the content of the first portion of the memory block to be migrated may be moved to the identified second portion of the memory block. A memory pool comprises one or more memory units. A memory unit may in turn comprise a portion, or portions, of one or more memory blocks.

Figure 2C:
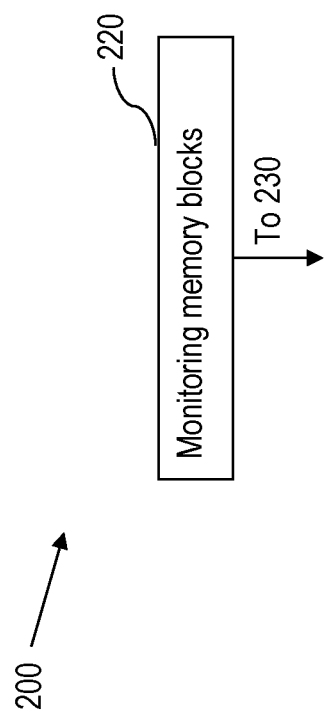
FIG. 2c is a flowchart of a method performed by a performance manager for managing the performance of a logical server of a data center, according to yet an exemplifying embodiment.

The method may further comprise, as illustrated in FIG. 2c, monitoring 220 the memory block.

The performance manager may continuously, irregularly or upon being triggered monitor the memory block. The performance manager may monitor a memory block or all memory blocks distributed in all memory pools, e.g. on a per logical server basis. The monitoring is performed in order to ascertain that the memories are performing and being used in a satisfactorily manner.

The performance manager may monitor different characteristics of the memory blocks for each logical server. This will be explained in more detail below.

The monitoring 220 of the memory blocks may comprise determining a memory grade for the first memory unit, based on at least characteristics associated with the first memory unit, and a memory grade for the second memory unit, based on at least characteristics associated with the second memory units well as characteristics of the connection link between respectively memory units and CPUs.

A memory grade is an example of how well the memory units are performing within a logical server. The performance manager may analyze one or more parameters and then based thereon determine the memory grade for a memory unit. The performance manager may monitor a plurality of, or even all, memory blocks of the memory pools and determine memory grades for all memory units associated with these memory blocks.

There are different ways of determining the memory grade for a memory unit. In an illustrative and non-limiting example, the memory grade is determined as:

$$\text{Grade} = \alpha * M_{Type} + \beta * M_{Latency} * M_{Occupancy},$$

where $\alpha$, $\beta$ and $\mu$ are coefficients reflecting weight of each parameter M towards calculating memory grades. For example, the parameter "memory to CPU latency" may be more important than the "occupancy rate of the memory unit", which may be defined using different values for $\beta$ and $\mu$. The parameters $M_{Type}$, $M_{latency}$ and $M_{occupancy}$ denote, respectively, the type of memory (Registered Memory Module, RDIMM, Load Reduced RDIMM, LRDIMM, Non-Volatile Memory express, NVMe, etc), latency to CPU pool, and percentage of used volume of each memory unit (the result may be similar to the one shown in table 1 in FIG. 3b), as will be explained in more detail below.

The performance characteristics associated with the first and second portion of the memory block, comprised in the respectively first and second memory unit, may be defined by one or more of (i) access rate of the respectively first and second memory unit, (ii) occupancy percentage of the respectively first and second memory unit, (iii) physical distance between the respectively first and second memory unit and a CPU resource (of the CPU pool) comprised in the logical server, (iv) respectively first and second memory unit characteristics e.g. memory type, memory operation cost, memory access delay, and (v) connection link and traffic conditions between the respectively first and second memory units and CPUs comprised in the logical server.

There are different examples of how to define the performance characteristics as stated above. Different parameters may be given different weights in order to differentiate which parameter(s) is/are most important or crucial. The logical server comprises the CPU resource, which CPU resource is comprised in a CPU pool, and the logical server also comprises a memory block. The memory block is associated with at least one memory unit, which in turn is comprised in at least one memory pool.

The performance characteristics associated with a portion of a memory block may thus depend on one or more different parameters, such as characteristics associated with the memory unit as such (e.g., the type of memory, or occupancy) or with the link to the memory unit (e.g., distance of the link to a CPU accessing the data of the memory unit), i.e., parameters that may be given a certain weight and used for calculating a grade of the memory unit as described above, as well as other parameters, e.g. frequency of access to data stored in the portion of the memory block, comprised in in the memory unit.

Embodiments will now be described with reference to FIGS. 3a-3m. The method disclosed herein performed by the performance manager, and the performance manager described below, provide a solution to enhance the performance of memory pools, but also the performance of logical servers and applications running on a logical server by e.g. providing access to faster memory communication if needed with no change in applications. This allows usage of the memory pools in more efficient way while improving application performance.

New data center hardware architectures rely on the principle of hardware resource disaggregation. The hardware disaggregation principle considers CPU, memory and network resources as individual and modular components. These resources tend to be organized in a pool-based way, i.e. there is at least a pool of CPU, at least a pool of memory units, and at least a pool of network interfaces. In this sense, a logical server, also referred to as a host, is composed of a subset of units/resources within one or more pools, see FIG. 1.

For example, with respect to the memory pools in disaggregated architecture, each memory pool can serve multiple logical servers (by providing dedicated memory unit(s) and/or memory blocks associated with memory unit(s) from the pool to each logical server), and a single logical server can eventually consume (or have allocated to it) memory resources from multiple memory pools.

This new architecture makes it possible to have new ways of implementations for various applications leading to better efficiency and resource utilization. Applications may run on top of logical server or instances which are instantiated when the request arrives. The amount of allocated resources and their characteristics may be dependent on the logical server and application requirements. In disaggregated architecture, memory pools might have different distances to/from the CPUs, leading to different communication delays. Moreover, different type of memories may be allocated to a certain logical server.

The solution proposed in this disclosure may optimize the use of memory blocks within the pools, e.g. using grading the units of memory based on their static and dynamic characteristics.

A memory block is the total memory volume, which could be a Random Access memory, RAM, or any fast block of memory, which is allocated or available to be used by logical servers also referred to as hosts/processes/instances/VMs.

This disclosure discloses an entity named as performance manager, which is responsible for monitoring memory blocks, keeping track of allocated parts of memories and their addressing, as well as upgrading memory grades and migration of data in stored in portions of a memory block.

FIG. 1 illustrates an example of a data center based on hardware disaggregated architecture. CPU pools (210-*x*), memory pools (220-*x*), Network Interface Card, NIC, pools (230-*x*) and storage pools (240-*x*) are shared between hosts (logical servers) (250). Each pool may have none, one or more management units. For example, the CPU pool might contain one or more MMU. The MMU is in charge of translating the memory addresses, and it is associated with the CPUs (either by being implemented as part of the CPU, or as a separate circuit). The memory pool may have one or more MMC which are responsible for handling performance of the memory nodes (221-*x*). NIC pools (230-*x*) may be used as the network interface for any of the components in the pools i.e. CPUs, memory, storage nodes that need external communication during their execution. Storage pools (240) contain a number of storage nodes for storing the resistant data of the users. A fast interconnect (204) connects the multiple resources.

Then there may be different logical servers (hosts), instances and/or processes that are responsible for running various applications on top of the aforementioned hardware layer (virtualization layer might be used on top of hardware resources for separating the application and the hardware, but it is out of the scope of this disclosure).

Figures 3A, 3B:
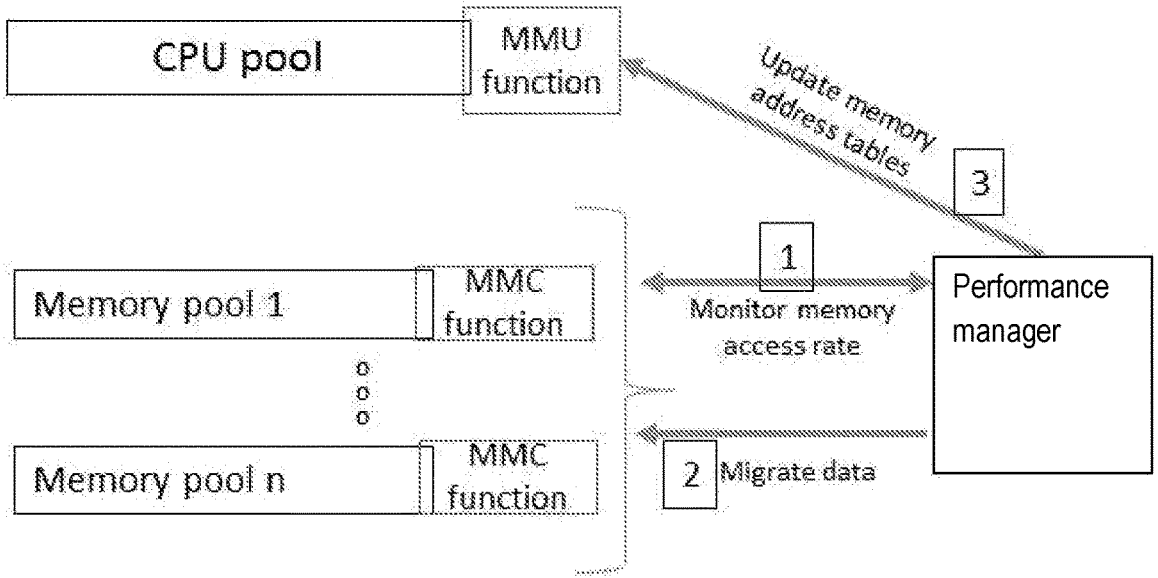
FIG. 3a is a schematic illustration of an exemplifying embodiment of a performance manager within a data center.
FIG. 3b shows Table 1, which is an example of memory units grading of a data center.

FIG. 3*a* illustrates an exemplifying structure of the performance manager. The performance manager may be in contact with at least one MMC which is responsible for managing memory pools. It also communicates with MMU (s) which are responsible for translating the memory addresses understandable by CPUs, applications, and operating systems.

The performance manager may keep a table of available memory units, and allocated blocks with their exact location and (physical) address. The performance manager may monitor the access rate and occupancy percentage of each memory unit, and update grade of memory units based on monitoring data as well as memory characteristics, such as memory type. Memory grades may be used for memory migration decisions for various applications. If needed, the performance manager may decide on migrating data in a portion of memory block to another portion of the memory block in another memory unit with better grade to improve performance of application and logical server, by sending a request to MMC as described above. The performance manager may also send new memory addresses to MMU to be updated in the virtual memory address tables.

The performance manager may thus act as a thin layer (bridging entity) between MMU, MMC and operating system, where no major changes is required in the MMC, MMU and operating system and platform layer.

The performance manager will now be described using an illustrative and non-limiting example. The performance manager may use the Grade=$\alpha^* M_{Type} + \beta^* M_{Latency} + \mu^* M_{occupancy}$, to determine the individual grades for each memory unit, or individual portions of a memory block within various pools, and keep them in a table. It is assumed that at the beginning system is empty, and no application is running on top of it. So, the first version of table may contain grading per memory unit, based on e.g. physical characteristics such as memory type, and distances to/from CPUs, and bandwidth of communication link among CPU pools and memory units. (which are mostly static and fixed). Each memory unit generally has a different grade towards each CPU pool. The memory block is in the distributed hardware often divided into a number of, usually different sized, portions which may be comprised in different physical memory units of the one or more memory pools. The memory grade of a memory unit may be associated with performance characteristics of the memory block being at least partially comprised in that memory unit.

As described above, $\alpha$, $\beta$ and $\mu$ are coefficients reflecting weight of each parameter M towards calculating memory grades. For example, the parameter "memory to CPU latency" may be more important than the "occupancy rate of the memory block", which may be defined using different values for $\beta$ and $\mu$. The parameters $M_{Type}$, $M_{latency}$ and $M_{occupancy}$ denote, respectively, the type of memory (RDIMM, LRDIMM, NVMe, . . . ), latency to CPU pool, and percentage of used volume of each memory unit (the result may be similar to the one shown in table 1 in FIG. 3*b*).

In the table, n, m and x represents number of memory pools, number of memory units per memory pool, and number of CPU pools, respectively. In this example, memory pool 1 is more suitable to be allocated to the processes in CPU pool 2, and memory pool n has better connection to CPU pool 1. This may be used as the basis to move data of the portions of the memory blocks related to the applications. When a part of the data in the memory is moved, the grade will be updated based on the new changes (e.g. in this case occupancy rate of that unit will change and the grade should be recalculated).

The performance manager may monitor the allocated memory blocks, or portions thereof, measuring access rate to the portion of the memory blocks. If the access rate of a portion of memory block passes a predefined threshold, the performance manager may check the table to find a better memory unit within the memory block with higher grade for the application using this specific portion of memory. If found, the performance manager may inform the MMC to do the mirroring/migration, and the MMU to update the addressing, see FIG. 3*c*.

Figure 3C:
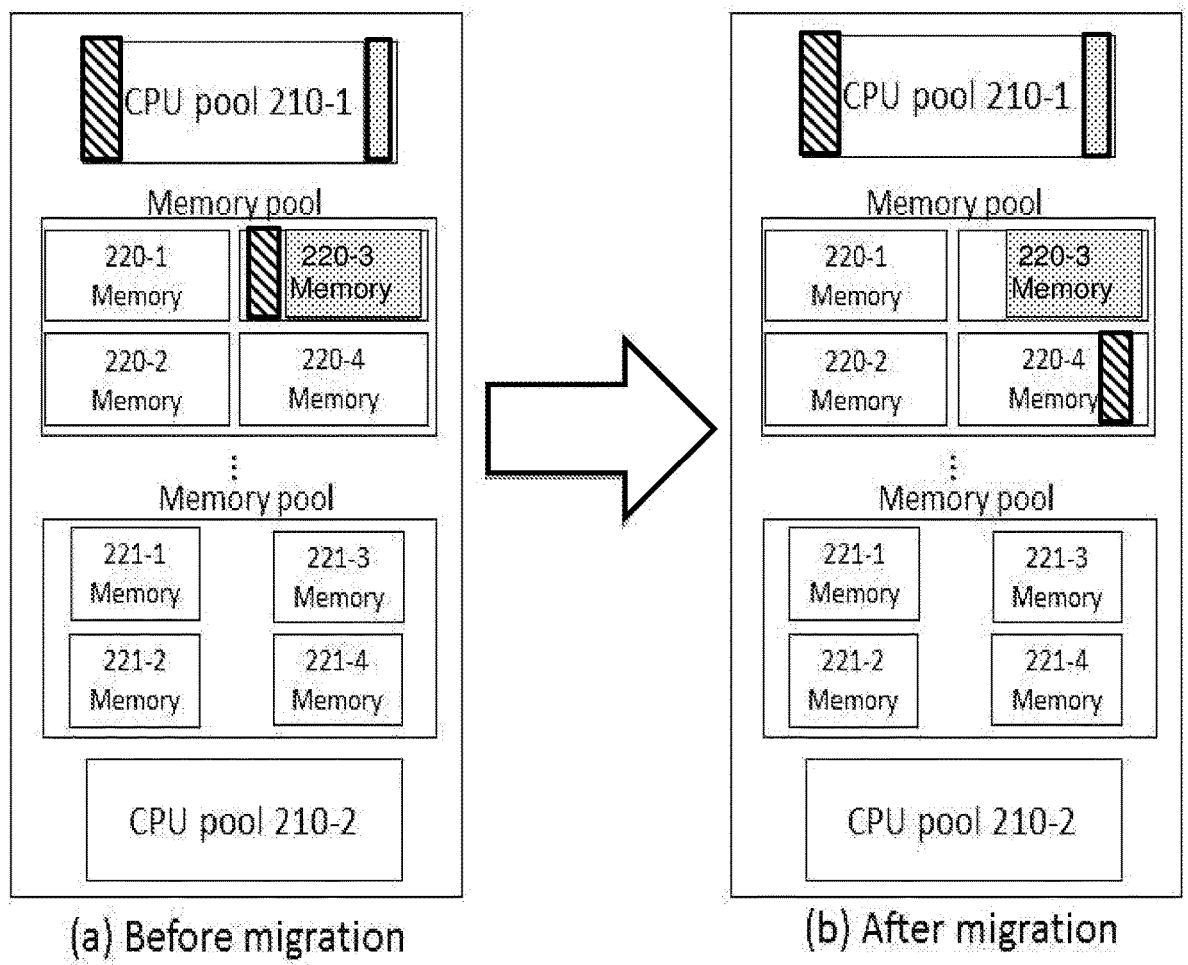
FIG. 3c is an exemplifying illustration of migration of data of a portion of a memory block, during run time.

As illustrated in FIG. 3*c*, two portion of a memory block for application 1 and 2 are selected from memory unit 220-3. So, the grade is updated for this memory unit due to the increase in occupancy rate, leading to lower grade of this memory unit compared to memory unit 220-4, which is empty but in the same memory pool. By monitoring the access rate of the memory unit 220-3, the performance manager detects an increase in the access rate to the portion of the memory unit 220-3 related to application 1 (being the smaller one in the figure), and tries to find a better memory unit with higher grade for this portion. The decision is to move this portion, i.e., data stored therein, from memory unit 220-3 to memory unit 220-4, as it has higher grade. The result is shown in right hand side of FIG. 3*c*.

Figure 3D:
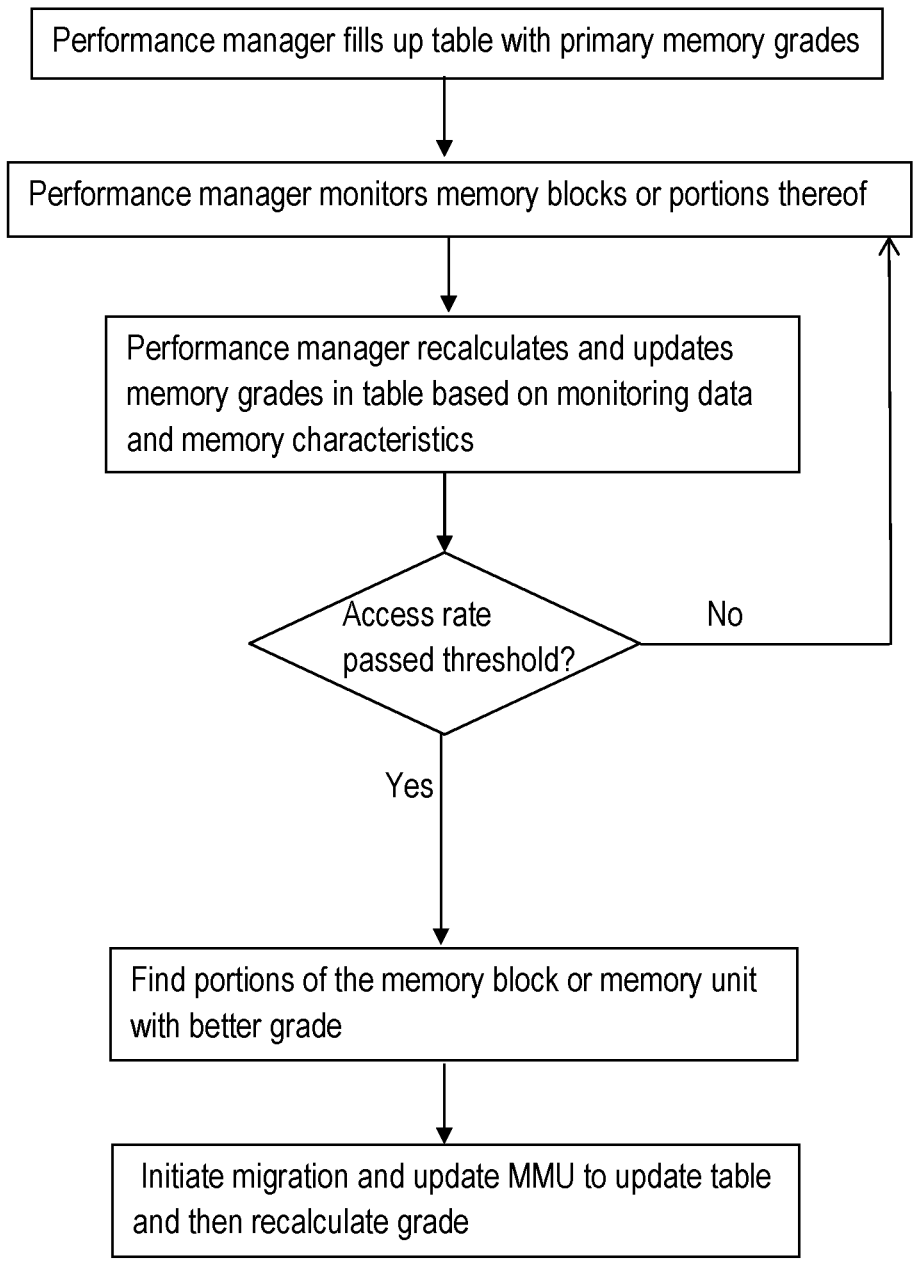
FIG. 3d is an example of a flowchart of a method performed within a data center.

FIG. 3*d* is an illustrative example of a flowchart of a method performed by a performance manager for managing the performance of a logical server of a data center. At start-up, the performance manager will, in this example, fill up a table of memory grades with regards to memory units, memory blocks and/or portions of memory blocks. It is pointed out that the performance manager disclosed herein is totally independent of the manner in which the memory units and the memory blocks are firstly allocated to logical servers and/or applications. After a memory unit, or a portion of memory block has been allocated to an application, the performance manager may recalculate and update the memory grades in the table. This is because each allocation may have an impact or effect on the memory grades with regard to the memory block or memory unit. The performance manager may then monitor memory units, memory blocks and/or portions of memory blocks in order to evaluate the performance of the memory, the logical servers and/or the applications running on the logical servers and thus making use of the memory. If the performance manager determines that e.g. a threshold with regard to access rate has been passed, the performance manager may try to find, or identify, a memory unit having a higher grade, thereby being more likely to better live up to the requirements of e.g. the application. Once the performance manager has found or identified such a memory unit, the performance manager instructs the MMC to perform the migration and the performance manager also updates the MMU to update the address translation table. The performance manger may then again recalculate the grades as they may possibly have been affected or impacted by the migration.

Embodiments herein also relate to a performance manager for managing the performance of a logical server of a data center. The data center comprising at least one Central Processing Unit, CPU, pool and at least one memory pool. The performance manager has the same technical features, objects and advantages as the method performed by the performance manager described above. The performance manager will only be described in brief in order to avoid unnecessary repetition. Exemplifying embodiments of such a performance manager will now be described with reference to FIGS. 4 and 5.

Figure 4:
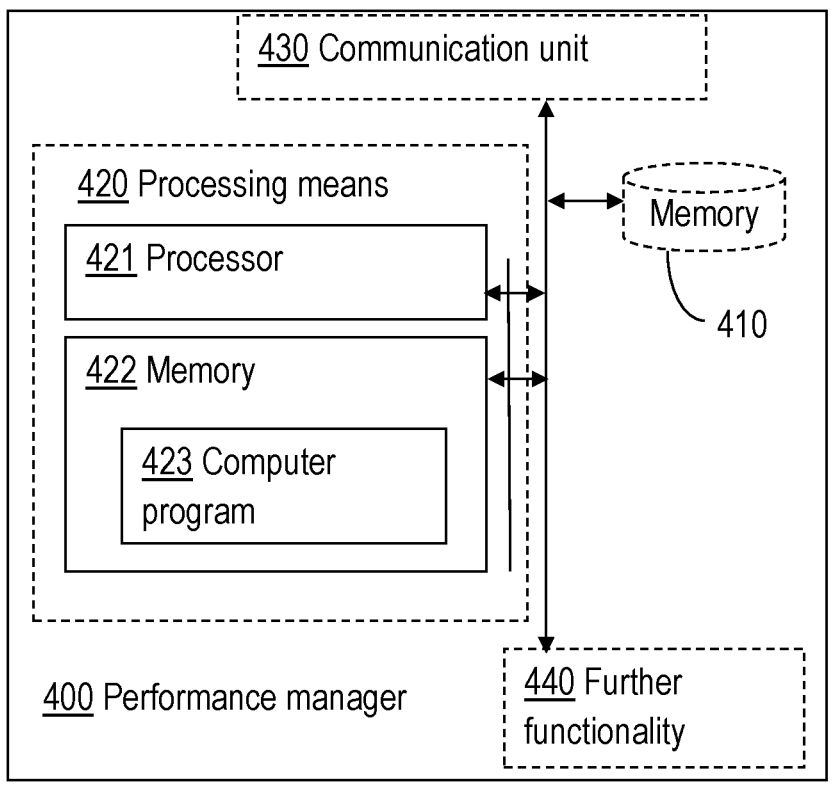
FIG. 4 is a block diagram of a performance manager for managing the performance of a logical server of a data center, according to an exemplifying embodiment.
Figure 5:
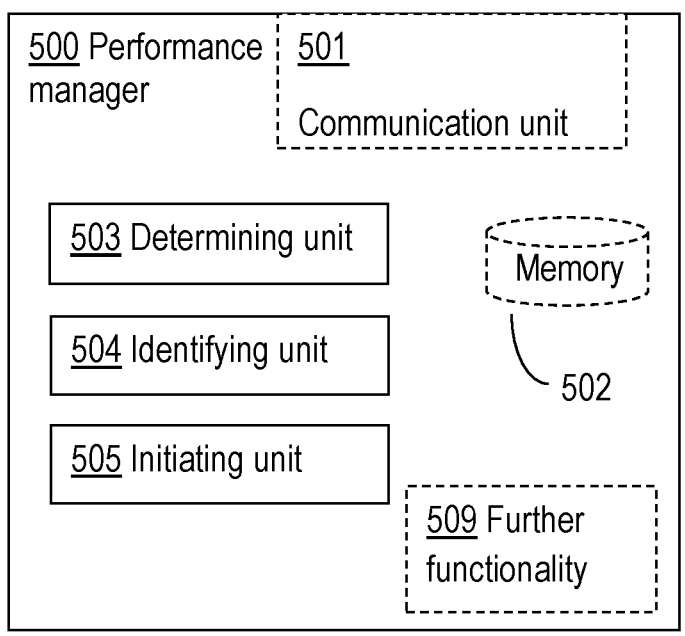
FIG. 5 is a block diagram of a performance manager for managing the performance of a logical server of a data center, according to another exemplifying embodiment.

FIGS. 4 and 5 illustrates the performance manager 400, 500) for managing the performance of a logical server of a data center, the data center comprising at least one memory pool, the performance manager being configured for determining performance characteristics associated with a first portion of a memory block, the first portion of the memory block, being comprised in a first memory unit of the at least one memory pool; and identifying a second portion of the memory block, comprised in a second memory unit of the at least one memory pool, to which data of the first portion of the memory block may be migrated, to apply the performance characteristics associated with the second portion of the memory block to the data. The performance manager 400, 500 is further configured for initiating migration of the data to the second portion of the memory block.

The performance manager 400, 500 may be implemented or realized in different ways. An exemplifying implementation is illustrated in FIG. 4. FIG. 4 illustrates the performance manager 400 comprising a processor 421 and memory 422, the memory comprising instructions, e.g. by means of a computer program 423, which when executed by the processor 421 causes the performance manager 400 to determine performance characteristics associated with a first portion of a memory block, comprised in a first memory unit of the at least one memory pool; and to identify a second portion of a memory block, comprised in a second memory unit of the at least one memory pool, to which data of the first portion of the memory block may be migrated, to apply performance characteristics associated with the second portion of the memory block to the data. The memory 422 further comprises instructions, e.g. by means of a computer program 423, which when executed by the processor 421 causes the performance manager 400 to initiate migration of the data to the second portion of the memory block.

FIG. 4 also illustrates the performance manager 400 comprising a memory 410. It shall be pointed out that FIG. 4 is merely an exemplifying illustration and memory 410 may optionally, be a part of the memory 422 or be a further memory of the performance manager 400 operable in the data center. The memory may for example comprise information relating to the performance manager 400, to statistics of operation of the performance manager 400, just to give a couple of illustrating examples. FIG. 4 further illustrates the performance manager 400 comprising processing means 420, which comprises the memory 422 and the processor 421. Still further, FIG. 4 illustrates the performance manager 400 comprising a communication unit 430. The communication unit 430 may comprise an interface through which the performance manager 400 communicates with resources, arrangements or entities of the data center. FIG. 4 also illustrates the performance manager 400 comprising further functionality 440. The further functionality 440 may comprise hardware or software necessary for the performance manager 400 to perform different tasks that are not disclosed herein.

An alternative exemplifying implementation of the performance manager 400, 500 is illustrated in FIG. 5. FIG. 5 illustrates the performance manager 500 comprising a determining unit 503 for determining performance characteristics associated with a first portion of a memory block, comprised in a first memory unit of the at least one memory pool; and an identifying unit 504 for identifying a second portion of the memory block, comprised in a second memory unit comprised in the at least one memory pool, to which data of the first portion of the memory block may be migrated, to apply the performance characteristics associated with the second portion of the memory block to the data. FIG. 5 also illustrates the performance manager 500 comprising an initiating unit 505 for initiating migration of the data to the second portion of the memory block.

In FIG. 5, the performance manager 500 is also illustrated comprising a communication unit 501. Through this unit, the performance manager 500 is adapted to communicate with other arrangements and/or entities in the data center. The performance manager 500 may further comprise a non-volatile memory 502 for storing data. Further, the performance manager 500 may comprise a control or processing unit (not shown) which in turn is connected to the different units 503-505. It shall be pointed out that this is merely an illustrative example and the performance manager 500 may comprise more, less or other units or modules which execute the functions of the performance manager 500 in the same manner as the units illustrated in FIG. 5.

It should be noted that FIG. 5 merely illustrates various functional units in the performance manager 500 in a logical sense. The functions in practice may be implemented using any suitable software and hardware means/circuits etc. Thus, the embodiments are generally not limited to the shown structures of the performance manager 500 and the functional units. Hence, the previously described exemplary embodiments may be realized in many ways. For example, one embodiment includes a computer-readable medium having instructions stored thereon that are executable by the control or processing unit for executing the method steps in, or performed by, the performance manager 500. The instructions executable by the computing system and stored on the computer-readable medium perform the method steps of the performance manager 500 as set forth in the claims.

The performance manager has the same possible advantages as the method performed by the performance manager. One possible advantage is that the usage of the memory pools and the memory allocated to logical servers may be improved or optimized. Another possible advantage is that memory blocks may be configured based on requirement(s) of application(s) running on logical servers. Still a further possible advantage is that the memory units comprising the portions of the memory blocks may be sorted and/or graded dynamically. Still further, logical server and application performance during runtime may be improved and the execution time may be speeded up meaning that more tasks may be executed with less amounts of resources and in shorter time.

According to an embodiment, the performance manager 400, 500 is further configured for updating at least one MMU associated with at least one CPU pool comprised in the data center about the initiation of migration of the data to the second portion of the memory block.

According to yet an embodiment, the performance manager 400, 500 is further configured for initiating migration of the at data to the second portion of the memory block by instructing at least one MMC to execute the migration.

According to still an embodiment, the performance manager 400, 500 is further configured for monitoring the memory block.

According to a further embodiment, the performance manager 400, 500 is further configured for monitoring the memory block by determining a memory grade for the first memory unit, based on at least characteristics associated with the first memory unit, and a memory grade for the second memory unit, based on at least characteristics associated with the second memory unit.

According to another embodiment, the performance characteristics associated with the first and second portion of the memory block, comprised in the respectively first and second memory unit, is defined by one or more of (i) access rate of the respectively first and second memory unit, (ii) occupancy percentage of the respectively first and second memory unit, (iii) physical distance between the respectively first and second memory unit and a CPU resource of the CPU pool comprised in the logical server, (iv) memory unit characteristics e.g. memory type, memory operation cost, memory access delay, and, (v) connection link and traffic conditions between the respectively first and second memory unit and CPUs comprised in the logical server.

Figure 6:
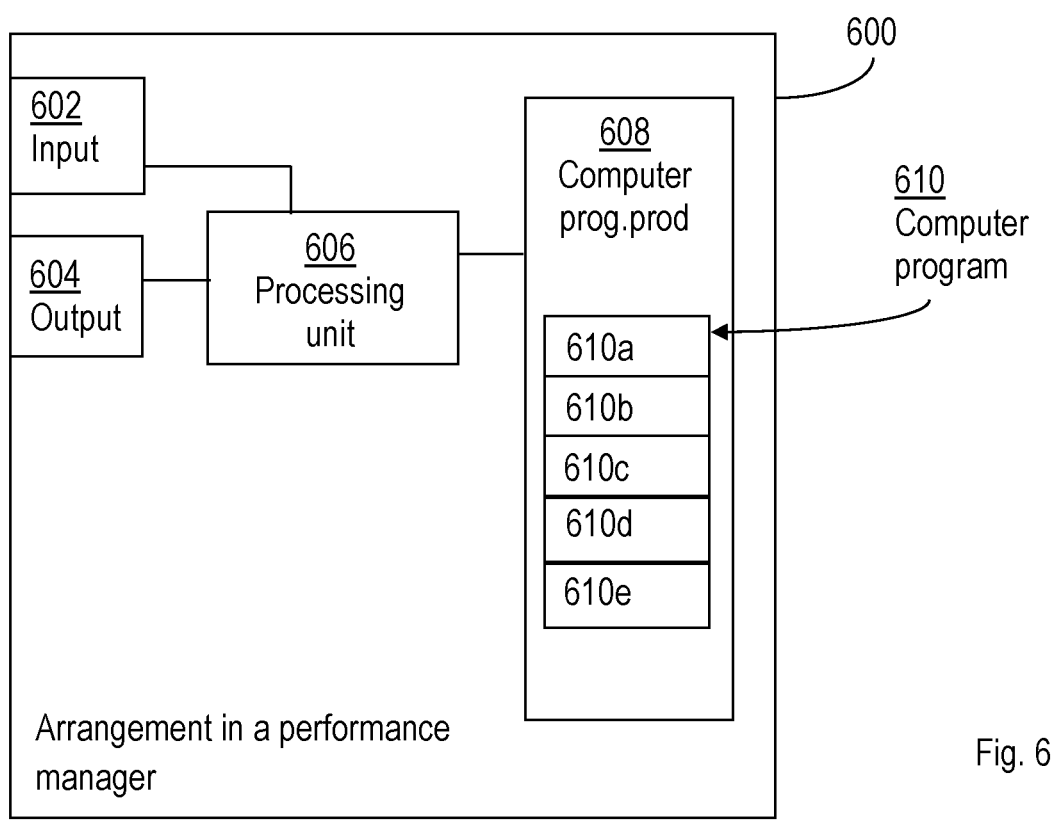
FIG. 6 is a block diagram of an arrangement in a performance manager for managing the performance of a logical server of a data center, according to an exemplifying embodiment.

FIG. 6 schematically shows an embodiment of an arrangement 600 in a performance manager 500 operable in a data center. Comprised in the arrangement 600 in the performance manager 500 are here a processing unit 606, e.g. with a DSP. The processing unit 606 may be a single unit or a plurality of units to perform different actions of procedures described herein. The arrangement 600 in the performance manager 500 may also comprise an input unit 602 for receiving signals from other entities or arrangements, and an output unit 604 for providing signal(s) to other entities or arrangements. The input unit and the output unit may be arranged as an integrated entity or as illustrated in the example of FIG. 5, as one or more interfaces 501.

Furthermore, the arrangement 600 in the performance manager 500 comprises at least one computer program product 608 in the form of a non-volatile memory, e.g. an EEPROM, a flash memory and a hard drive. The computer program product 608 comprises a computer program 610, which comprises code means, which when executed in the processing unit 606 in the arrangement 600 in the performance manager 500 data center causes the performance manager 500 to perform the actions e.g. of the procedure described earlier in conjunction with FIGS. 2a-2c.

The computer program 610 may be configured as a computer program code structured in computer program modules 610a-610e. Hence, in an exemplifying embodiment, the code means in the computer program of the arrangement 600 in the performance manager 500 comprises a determining unit, or module, for determining performance characteristics associated with a first portion of a memory block, comprised in a first memory unit of the at least one memory pool; and an identifying unit, or module, for identifying a second portion of a memory block, comprised in a second memory unit of the at least one memory pool, to which data of the first portion of the memory block may be migrated, to apply the performance characteristics associated with the second portion of the memory block to the data. The computer program further comprises an initiating unit, or module, for initiating migration of the data to the second portion of the memory block.

The computer program modules could essentially perform the actions of the flow illustrated in FIGS. 2a-2c, to emulate the performance manager 500 in the data center. In other words, when the different computer program modules are executed in the processing unit 606, they may correspond to the units 503-505 of FIG. 5.

Although the code means in the respective embodiments disclosed above in conjunction with FIG. 5 is implemented as computer program modules which when executed in the processing unit causes the performance manager to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the performance manager.

It is to be understood that the choice of interacting units, as well as the naming of the units within this disclosure are only for exemplifying purpose, and nodes suitable to execute any of the embodiments of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method, performed by a performance manager, for managing the performance of a logical server of a data center, the data center comprising at least one memory pool in which a memory block has been allocated to the logical server, the method comprising the performance manager:
   determining performance characteristics associated with a first portion of the memory block comprised in a first memory unit of the at least one memory pool, wherein the performance characteristics associated with the first portion of the memory block are determined based on a plurality of weighted parameters, each of which is calculated according to a corresponding weighting factor;
   identifying a second portion of the memory block, comprised in a second memory unit of the at least one memory pool, to which data of the first portion of the memory block may be migrated, to apply performance characteristics associated with the second portion of the memory block to the data;
   initiating migration of the data to the second portion of the memory block; and
   monitoring the memory block, wherein the monitoring the memory block comprises:
      determining a first memory grade for the first memory unit based on at least characteristics associated with the first memory unit, wherein the first memory grade indicates a current performance of the first memory unit after migration and is determined as a function of:
         a weighted memory type of the first memory unit;
         a weighted latency of the first memory unit; and
         a weighted occupancy percentage of the first memory unit; and
      determining a second memory grade for the second memory unit based on at least characteristics associated with the second memory unit, wherein the second memory grade indicates a current performance of the second memory unit after migration and is determined as a function of:
         a weighted memory type of the second memory unit;
         a weighted latency of the second memory unit; and
         a weighted occupancy percentage of the second memory unit.

2. The method of claim 1, further comprising the performance manager updating at least one Memory Management Unit (MMU), associated with at least one CPU pool comprised in the data center, about the initiation of the migration of the data to the second portion of the memory block.

3. The method of claim 1, wherein the initiating migration of the data to the second portion of the memory block comprises instructing a Memory Management Controller to execute the migration.

4. The method of claim 1, wherein the performance characteristics associated with the first portion and the second portion of the memory block are defined by:
   access rates of the first and second memory units respectively;
   the occupancy percentage of the first and second memory units respectively;
   physical distances between the first and second memory units and a CPU resource of the CPU pool comprised in the logical server;
   and/or
   connection link and traffic conditions between the first and second memory units, respectively, and CPUs comprised in the logical server.

5. A performance manager for managing the performance of a logical server of a data center, the data center comprising at least one memory pool in which a memory block has been allocated to the logical server, the performance manager comprising:
   processing circuitry;
   memory containing instructions executable by the processing circuitry whereby the performance manager is operative to:
      determine performance characteristics associated with a first portion of a memory block comprised in a first memory unit of the at least one memory pool, wherein the performance characteristics associated with the first portion of the memory block are determined based on a plurality of weighted parameters, each of which is calculated according to a corresponding weighting factor;
      identify a second portion of the memory block, comprised in a second memory unit of the at least one memory pool, to which data of the first portion of the memory block may be migrated, to apply performance characteristics associated with the second portion of the memory block to the data;
      initiate migration of the data to the second portion of the memory block; and
      monitor the memory block, wherein the instructions are such that the performance manager is operative to monitor the memory bock by:
         determining a first memory grade for the first memory unit based on at least characteristics associated with the first memory unit, wherein the first memory grade indicates a current performance of the first memory unit after migration and is determined as a function of:
            a weighted memory type of the first memory unit;
            a weighted latency of the first memory unit; and
            a weighted occupancy percentage of the first memory unit; and
         determining a second memory grade for the second memory unit based on at least characteristics associated with the second memory unit, wherein the second memory grade indicates a current performance of the second memory unit after migration and is determined as a function of:
            a weighted memory type of the second memory unit;
            a weighted latency of the second memory unit; and
            a weighted occupancy percentage of the second memory unit.

6. The performance manager of claim 5, wherein the instructions are such that the performance manager is operative to update at least one Memory Management Unit (MMU), associated with at least one CPU pool comprised in the data center, about the initiation of the migration of the data to the second portion of the memory block.

7. The performance manager of claim 5, wherein the instructions are such that the performance manager is operative to initiate the migration of the data to the second portion of the memory block by instructing at least a Memory Management Controller to execute the migration.

8. The performance manager of claim 5, the performance characteristics associated with the first portion and the second portion of the memory block are defined by:

access rates of the first and second memory units respectively;

the occupancy percentage of the first and second memory units respectively;

physical distances between the first and second memory units and a CPU resource of the CPU pool comprised in the logical server;

and/or connection link and traffic conditions between the first and second memory units, respectively, and CPUs comprised in the logical server.

9. A non-transitory computer readable recording medium storing a computer program product for controlling a performance manager for managing the performance of a logical server of a data center, the data center comprising at least one memory pool in which a memory block has been allocated to the logical server, the computer program product comprising software instructions which, when run on processing circuitry of the performance manager, causes the performance manager to:

determine performance characteristics associated with a first portion of the memory block comprised in a first memory unit of the at least one memory pool, wherein the performance characteristics associated with the first portion of the memory block are determined based on a plurality of weighted parameters, each of which is calculated according to a corresponding weighting factor;

identify a second portion of the memory block, comprised in a second memory unit of the at least one memory pool, to which data of the first portion of the memory block may be migrated, to apply performance characteristics associated with the second portion of the memory block to the data;

initiate migration of the data to the second portion of the memory block; and monitor the memory block by:

determining a first memory grade for the first memory unit based on at least characteristics associated with the first memory unit, wherein the first memory grade indicates a current performance of the first memory unit after migration and is determined as a function of:

a weighted memory type of the first memory unit;

a weighted latency of the first memory unit; and a weighted occupancy percentage of the first memory unit; and determining a second memory grade for the second memory unit based on at least characteristics associated with the second memory unit, wherein the second memory grade indicates a current performance of the second memory unit after migration and is determined as a function of:

a weighted memory type of the second memory unit;

a weighted latency of the second memory unit; and a weighted occupancy percentage of the second memory unit.

\* \* \* \* \*